(12) United States Patent
Morinaga et al.

(10) Patent No.: US 6,463,735 B2
(45) Date of Patent: Oct. 15, 2002

(54) APPARATUS FOR DETECTING DETERIORATION OF EXHAUST GAS PURIFYING CATALYSTS

(75) Inventors: Shujiro Morinaga, Takahama (JP); Masaaki Nakayama, Toyoake (JP); Naoki Yoshiume, Kariya (JP); Masahiko Yamaguchi, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/925,521

(22) Filed: Aug. 10, 2001

(65) Prior Publication Data

US 2002/0026789 A1 Mar. 7, 2002

(30) Foreign Application Priority Data

Sep. 1, 2000 (JP) .................................... 2000-269888

(51) Int. Cl.$^7$ ................................................ F01N 3/00
(52) U.S. Cl. ............................. 60/277; 60/276; 60/285
(58) Field of Search ........................... 60/277, 276, 285

(56) References Cited

U.S. PATENT DOCUMENTS

| 5,579,637 A | * 12/1996 | Yamashita et al. ............. 60/277 |
| 5,740,676 A | * 4/1998 | Agustin et al. ................ 60/276 |
| 5,845,489 A | * 12/1998 | Dohta et al. .................. 60/277 |
| 6,003,309 A | * 12/1999 | Agustin et al. ................ 60/277 |
| 6,253,541 B1 | * 7/2001 | Sullivan et al. ............... 60/274 |
| 6,256,981 B1 | * 7/2001 | Sullivan et al. ............... 60/274 |
| 6,321,529 B1 | * 11/2001 | Mueller et al. ................ 60/277 |
| 6,330,795 B1 | * 12/2001 | Takaku et al. ................. 60/277 |

FOREIGN PATENT DOCUMENTS

| JP | 6-10738 | 1/1994 |
| JP | 6-294342 | 10/1994 |

* cited by examiner

*Primary Examiner*—Thomas Denion
*Assistant Examiner*—Diem Tran
(74) *Attorney, Agent, or Firm*—Nixon & Vanderhye P.C.

(57) ABSTRACT

An engine has an upstream-side catalyst and a downstream-side catalyst. First and second air-fuel ratio sensors are provided on the upstream and downstream sides of the upstream-side catalyst, respectively. A third air-fuel ratio sensor is provided on the downstream side of the downstream-side catalyst. The deteriorating state of the upstream-side catalyst is diagnosed during a period of time in which the third sensor is outputting a voltage in a predetermined range, and the air-fuel ratio is controlled to maintain the voltage output of the third sensor in the predetermined range during the period of time to diagnose the deteriorating state of the upstream-side catalyst.

22 Claims, 10 Drawing Sheets

APPARATUS FOR DETECTING DETERIORATION OF EXHAUST GAS PURIFYING CATALYSTS

CROSS REFERENCE TO RELATED APPLICATION

This application is based on and incorporates herein by reference Japanese Patent Application No. 2000-269888 filed on Sep. 1, 2000.

BACKGROUND OF THE INVENTION

The present invention relates to an apparatus for detecting deterioration of a catalyst which is used for purifying exhaust gas and is employed in an exhaust gas purifying system.

In an exhaust gas purifying system of an automobile manufactured in recent years, two catalysts, that is, an upstream-side catalyst and a downstream-side catalyst, are installed in series on an exhaust pipe in order to increase an exhaust gas purifying rate as disclosed in JP-A-6-294342. Two air-fuel ratio sensors (oxygen sensors) may be provided on the upstream and downstream sides of the upstream-side catalyst respectively. In addition, an air-fuel ratio sensor (an oxygen sensor) may be provided on the downstream side of the downstream-side catalyst.

Existence or non-existence of the deteriorating state of the upstream-side catalyst is diagnosed in such dual-catalyst exhaust gas purifying system by detecting ratios of attributes of an output generated by the upstream-side air-fuel ratio sensor of the upstream-side catalyst to attributes of an output generated by the downstream-side air-fuel ratio sensor of the upstream-side catalyst in the same way as the conventional one-catalyst exhaust gas purifying system. The attributes of an output include the frequency and the amplitude of the output.

In order to detect the deteriorating state of the upstream-side catalyst with a high degree of precision, it is necessary to forcibly switch an air-fuel ratio control condition to a condition suitable for a diagnosis of the deteriorating state of the upstream-side catalyst so as to make an effect of the deteriorating state of the upstream-side catalyst noticeably appear in the variation of a signal output of the downstream-side air-fuel ratio sensor of the upstream-side catalyst. In consequence, the exhaust gas purifying rate of upstream-side catalyst during the period of time to diagnose the deteriorating state of the upstream-side catalyst decreases. Thus, the quantity of an unpurified gas component passing through the upstream-side catalyst tends to increase. As a result, the quantity of an unpurified gas component which must be removed by the downstream-side catalyst also increases as well.

However, since the air-fuel ratio control condition is forcibly switched to a condition suitable for a diagnosis of the deteriorating state of the upstream-side catalyst during the period of time to diagnose the deteriorating state of the upstream-side catalyst, the air-fuel ratio of exhaust gas entering the downstream-side catalyst tends to depart from the most efficient purifying range of the downstream-side catalyst. The purifying range is a range of the air-fuel ratio for which the exhaust gas purifying rate is high. Thus, the exhaust gas purifying rate of downstream-side catalyst during the period of time to diagnose the deteriorating state of the upstream-side catalyst tends to decrease in spite of the fact that the quantity of an unpurified gas component passing through the upstream-side catalyst tends to increase. As a result, it is likely that exhaust emission is worsened during the period of time to diagnose the deteriorating state of the upstream-side catalyst.

SUMMARY OF THE INVENTION

It is thus an object of the present invention addressing the problems to provide an apparatus for detecting the deteriorating state of an upstream-side catalyst for purifying exhaust gas by diagnosing the deteriorating state of the upstream-side catalyst without worsening exhaust emission.

In order to achieve the object, the present invention provides an apparatus for detecting the deteriorating state of one of a plurality of catalysts installed on an exhaust pipe of an internal combustion engine and used for purifying exhaust gas. Specifically, the catalysts include an upstream-side catalyst and a downstream-side catalyst. Two air-fuel ratio sensors are provided on the upstream and downstream sides of the upstream-side catalyst respectively. In addition, an air-fuel ratio sensor is provided on the downstream side of the downstream-side catalyst. The air-fuel ratio sensors are each used for detecting the air-fuel ratio of exhaust gas, that is, for determining whether the air-fuel ratio has a value on the rich or lean side with respect to the stoichiometric air-fuel ratio. The existence or the non-existence of the deteriorating state of the upstream-side catalyst is determined on the basis of at least a signal output of the downstream-side air-fuel ratio sensor of the upstream-side catalyst. At that time, the air-fuel ratio is controlled to take a signal output of the downstream-side air-fuel ratio sensor of the downstream-side catalyst into a predetermined range during the period of time to diagnose the deteriorating state of the upstream-side catalyst.

The signal output of the downstream-side air-fuel ratio sensor of the downstream-side catalyst is a parameter reflecting the air-fuel ratio of exhaust gas passing through the downstream-side catalyst. Thus, if the air-fuel ratio is controlled to take a signal output of the downstream-side air-fuel ratio sensor of the downstream-side catalyst into the predetermined range, the air-fuel ratio of exhaust gas passing through the downstream-side catalyst can be adjusted to a value within the most efficient purifying range of the downstream-side catalyst. Thus, even if the exhaust gas purifying rate of upstream-side catalyst during the period of time to diagnose the deteriorating state of the upstream-side catalyst decreases, causing the quantity of an unpurified gas component passing through the downstream-side catalyst to rise, the unpurified gas can be purified by the downstream-side catalyst with a high degree of efficiency. As a result, while the existence or non-existence of the deteriorating state of the upstream-side catalyst is being determined with a high degree of precision, exhaust emission can be prevented from becoming worse.

Alternatively, the deteriorating state of the upstream-side catalyst can be diagnosed during a period of time in which a signal output of the downstream-side air-fuel ratio sensor of the downstream-side catalyst has a value in the predetermined range. The deteriorating state of the upstream-side catalyst can be diagnosed during a period of time in which the air-fuel ratio of exhaust gas passing through the downstream-side catalyst has a value within the most efficient purifying range of the downstream-side catalyst.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

First Embodiment

Figure 1:
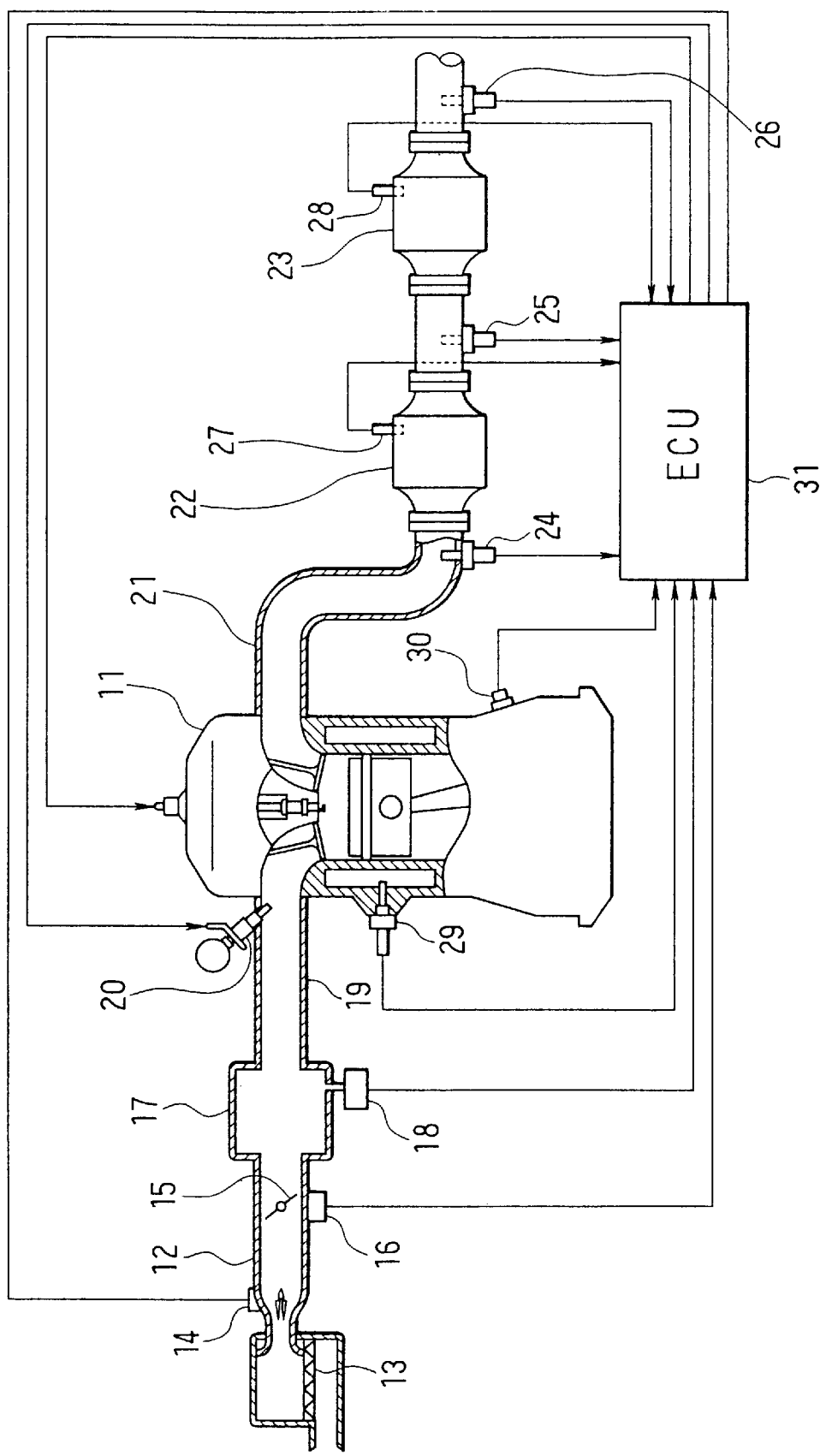
FIG. 1 is a schematic diagram showing an engine control system to which a first embodiment of the present invention is applied.

A first embodiment of the present invention is shown in FIGS. 1 to 6. Referring to FIG. 1. An air cleaner 13 is provided on the uppermost-stream side of an intake pipe 12 employed in an engine 11 serving as an internal combustion engine. On the downstream side of the air cleaner 13, there is provided an air-flow meter 14 for measuring the amount of intake air. On the downstream side of the air-flow meter 14, there are installed a throttle valve 15 and a throttle angle sensor 16 for detecting a throttle opening angle of the throttle valve 15.

On the downstream side of the throttle valve 15, a surge tank 17 is provided. On the surge tank 17, there is provided an intake air pressure sensor 18 for detecting the pressure of intake air. Also on the surge tank 17, there are installed intake manifolds 19 each used for introducing air to a cylinder of the engine 11. At a location in close proximity to an intake port of each of the intake manifolds 19 of the cylinders, there is provided a fuel injection valve 20 for injecting fuel to each of the cylinders.

At a middle position of an exhaust pipe 21 employed in the engine 11, on the other hand, there are installed an upstream-side catalyst 22 and a downstream-side catalyst 23, which are each typically a three-way catalyst for. removing components such as CO, HC and NOx from exhaust gas. First and second air-fuel ratio sensors 24 and 25 are provided on the upstream and downstream sides of the upstream-side catalyst 22, respectively. In addition, a third air-fuel ratio sensor 26 is provided on the downstream side of the downstream-side catalyst 23. The air-fuel ratio sensors 24, 25 and 26 are each used for detecting the air-fuel ratio of exhaust gas, that is, for determining whether the air-fuel ratio has a value on the rich or lean side with respect to the stoichiometric ratio. The first air-fuel ratio sensor 24 is an air-fuel ratio sensor generating a linear air-fuel ratio signal representing the air-fuel ratio of exhaust gas. On the other hand, the second air-fuel ratio sensor 25 and the third air-fuel ratio sensor 26 are each an oxygen sensor which stepwisely changes the voltage output in accordance with whether the air-fuel ratio of exhaust gas has a value on the rich or lean side with respect to the stoichiometric air-fuel ratio.

In addition, the upstream-side catalyst 22 and the downstream-side catalyst 23 are provided with first and second temperature sensors 27 and 28, respectively. The first temperature sensor 27 and the second temperature sensor 28 are used for detecting the temperatures of the upstream-side catalyst 22 and the downstream-side catalyst 23, respectively. Furthermore, on the cylinder block of the engine 11, there are installed a water temperature sensor 29 for detecting the temperature of cooling water and a crank angle sensor 30 for detecting the rotational speed of the engine 11.

Signals generated by the sensors are supplied to an electronic control unit (ECU) 31. The ECU 31 has a microcomputer for executing an air-fuel ratio feedback (F/B) control program and a sub-feedback (F/B) control program, which are stored in a built-in ROM (a storage medium), to control the air-fuel ratio of exhaust gas on the basis of signals output by the first air-fuel ratio sensor 24 and the second air-fuel ratio sensor 25. In this case, the air-fuel ratio feedback control program computes an air-fuel ratio feedback coefficient FAF1 which is referred to as a main F/B correction coefficient. The main F/B correction coefficient FAF1 is a coefficient for correcting the air-fuel ratio of exhaust gas on the upstream side of the upstream-side catalyst 22 by adoption of a feedback technique based on the output of the first air-fuel ratio sensor 24 so as to make the air-fuel ratio match a target air-fuel ratio $\lambda TG$. It should be noted that this air-fuel ratio represents the-fuel injection amount.

On the other hand, the sub-feedback control program computes a sub-feedback coefficient FAF2, which is referred to as a sub-F/B correction coefficient, as follows. The sub-F/B correction coefficient FAF2 is a coefficient for correcting the target air-fuel ratio $\lambda TG$ of exhaust gas on the upstream side of the upstream-side catalyst 22 by adoption of a feedback technique based on the output of the second air-fuel ratio sensor 25 so as to make the air-fuel ratio of exhaust gas on the downstream of the upstream-side catalyst 22 match a control target value such as the stoichiometric air-fuel ratio.

Figure 6:
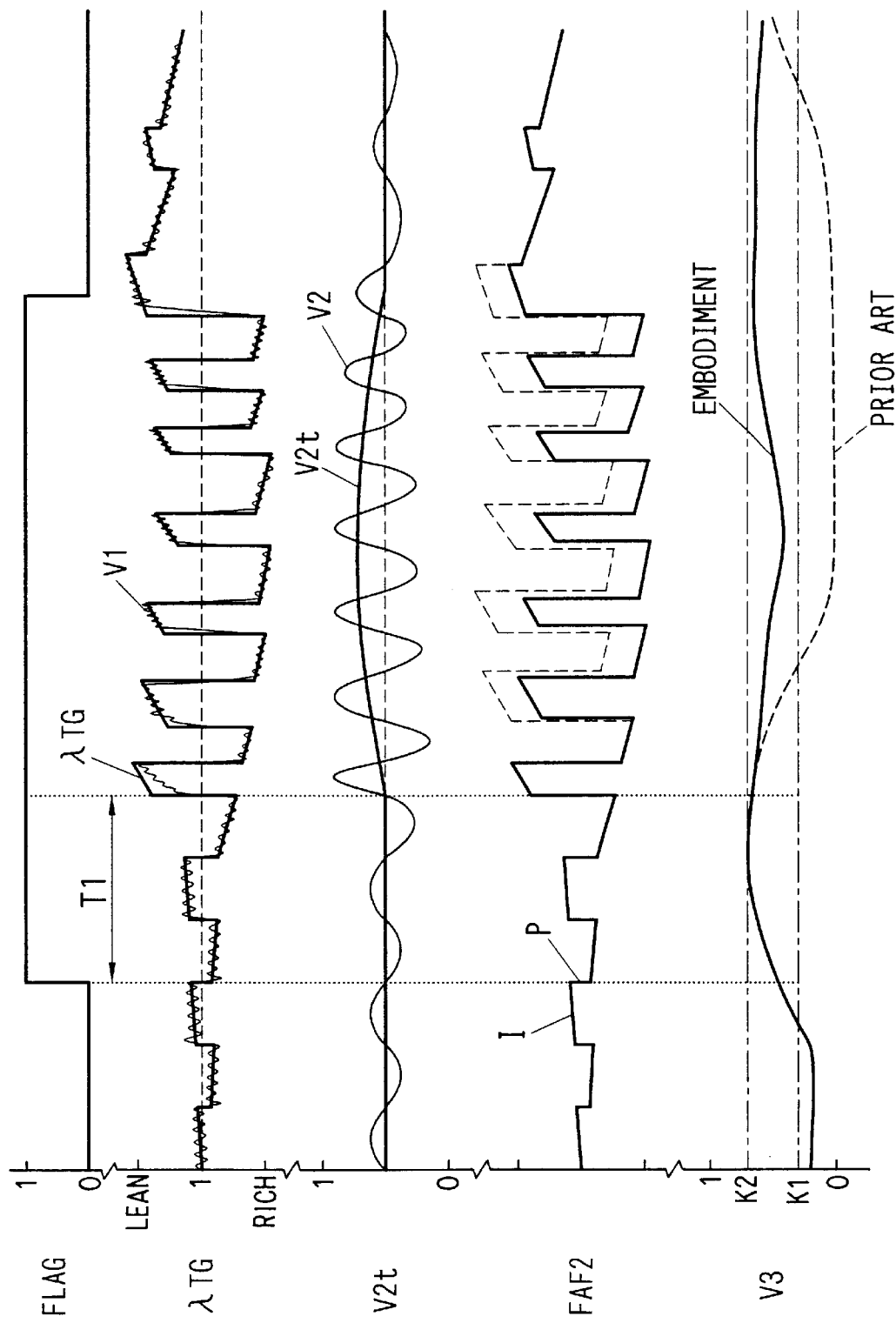
FIG. 6 is a timing diagram showing a typical operation of the first embodiment.

First of all, the voltage output of the second air-fuel ratio sensor 25 is detected to determine whether the voltage is higher or lower than a level of typically 0.45 V corresponding to the control target value indicative of the stoichiometric air-fuel ratio. A voltage higher than the level indicates an air-fuel ratio on the rich side while a voltage lower than the level indicates an air-fuel ratio on the lean side. As shown in FIG. 6, during a rich period of time., a process to cumulatively add an integral term (I) to the sub-F/B correction coefficient FAF2 is carried out repeatedly. As the rich period of time transits to a lean period of time, a proportional term (P) is subtracted from the sub-F/B correction coefficient FAF2. Then, during the lean period of time, a process to subtract the integral term from a remainder in the immediately preceding subtraction is carried out repeatedly. As the lean period of time transits to a rich period of time, a proportional term is added to the sub-F/B correction coefficient FAF2.

As a result, at a transition from a rich period of time to a lean period of time (or vice versa) of the signal output of the second air-fuel ratio sensor 25, the sub-F/B correction coefficient FAF2 skips from a value on the rich side to a value on the lean side or vice versa. As a result, the target air-fuel ratio λTG of exhaust gas on the upstream side of the upstream-side catalyst 22 also skips from a value on the rich side to a value on the lean side or vice versa.

The air-fuel ratio feedback control program computes the main F/B correction coefficient FAF1 for reducing the difference between the output of the first air-fuel ratio sensor 24 and the target air-fuel ratio λTG set by using the sub-F/B correction coefficient FAF2. The air-fuel ratio feedback control program also computes the basic fuel injection amount for the operating state of the engine 11 from typically a map data. The air-fuel ratio feedback control program then corrects the basic fuel injection amount by using the main F/B correction coefficient FAF1 and other correction coefficients such as a temperature correction coefficient and a learning correction coefficient to result in a final fuel injection amount.

Figure 2:
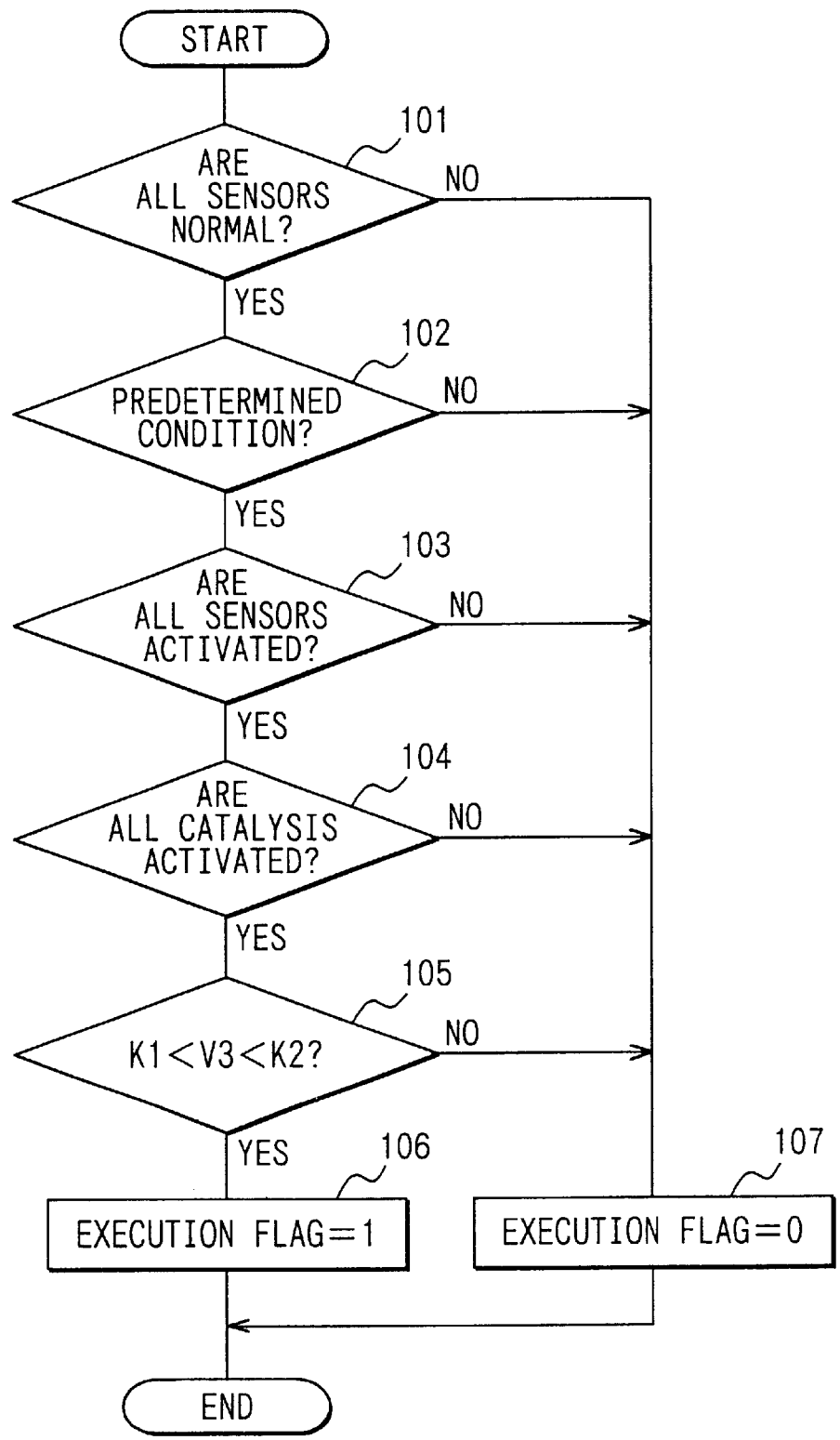
FIG. 2 is a flow diagram showing a catalyst deterioration diagnosis execution condition determination program executed in the first embodiment.
Figure 3:
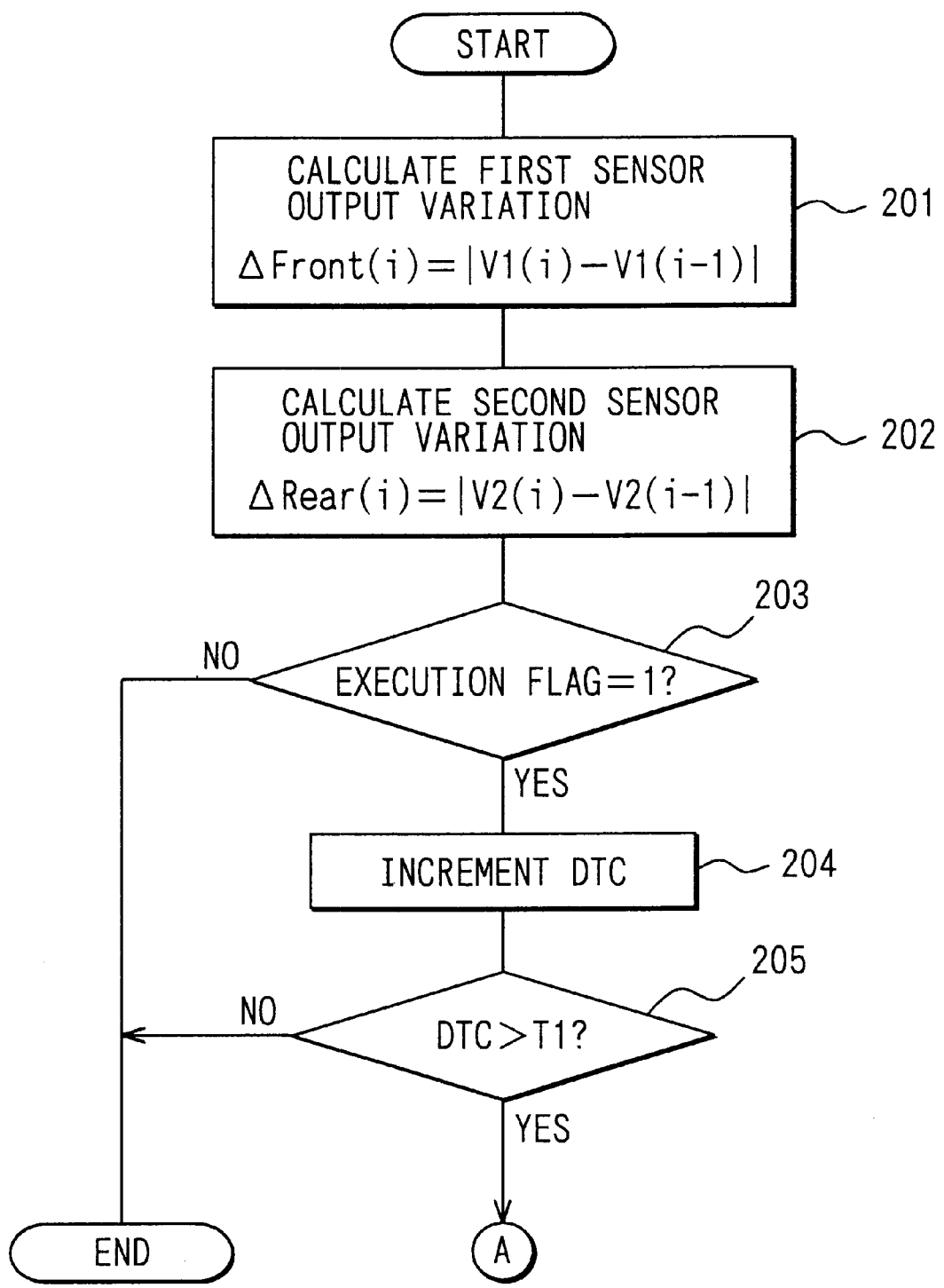
FIG. 3 is a flow diagram showing a first part of a catalyst deterioration diagnosing program executed in the first embodiment.
Figure 4:
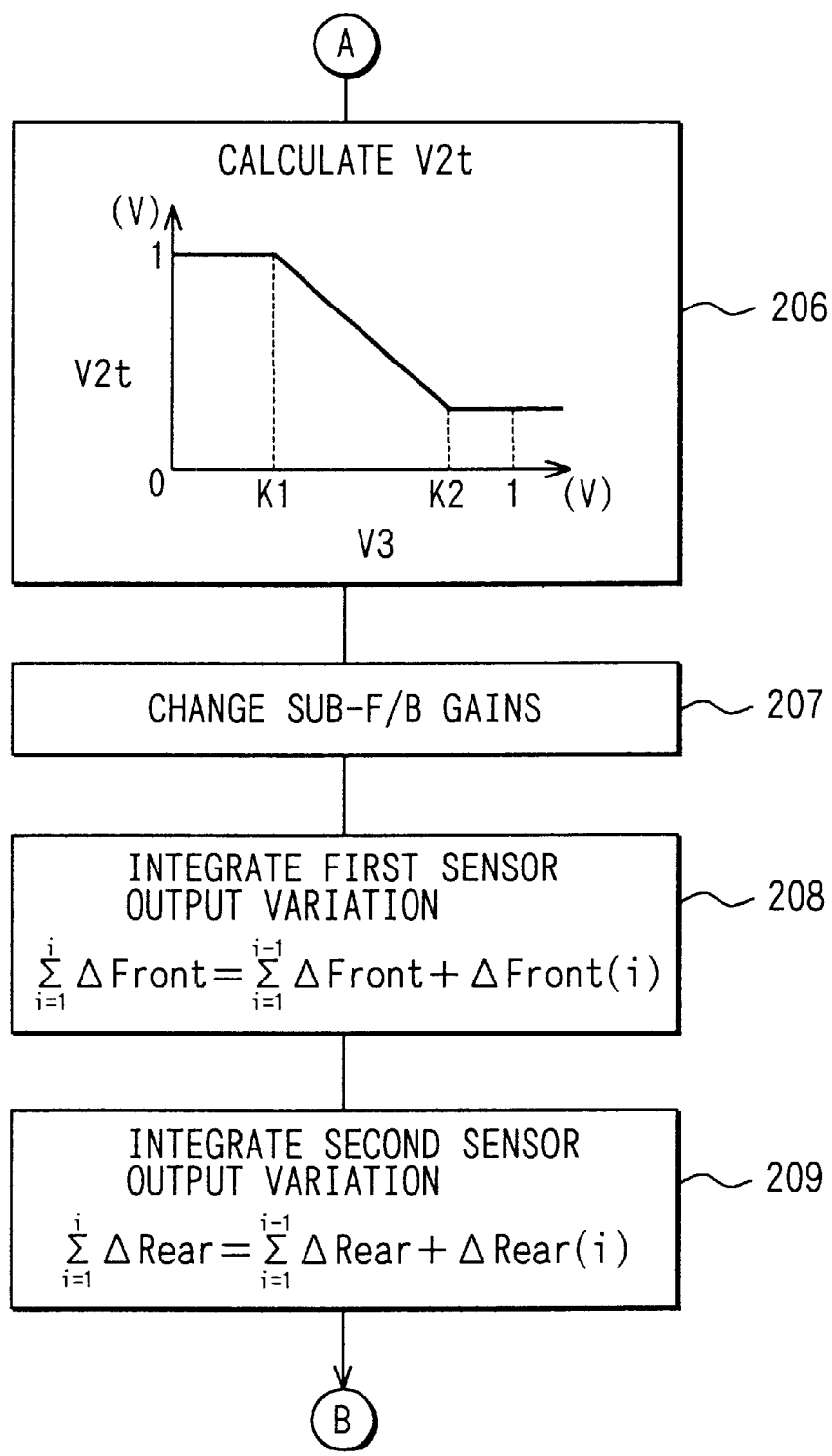
FIG. 4 is a flow diagram showing a second part of the catalyst deterioration diagnosing program executed in the first embodiment.
Figure 5:
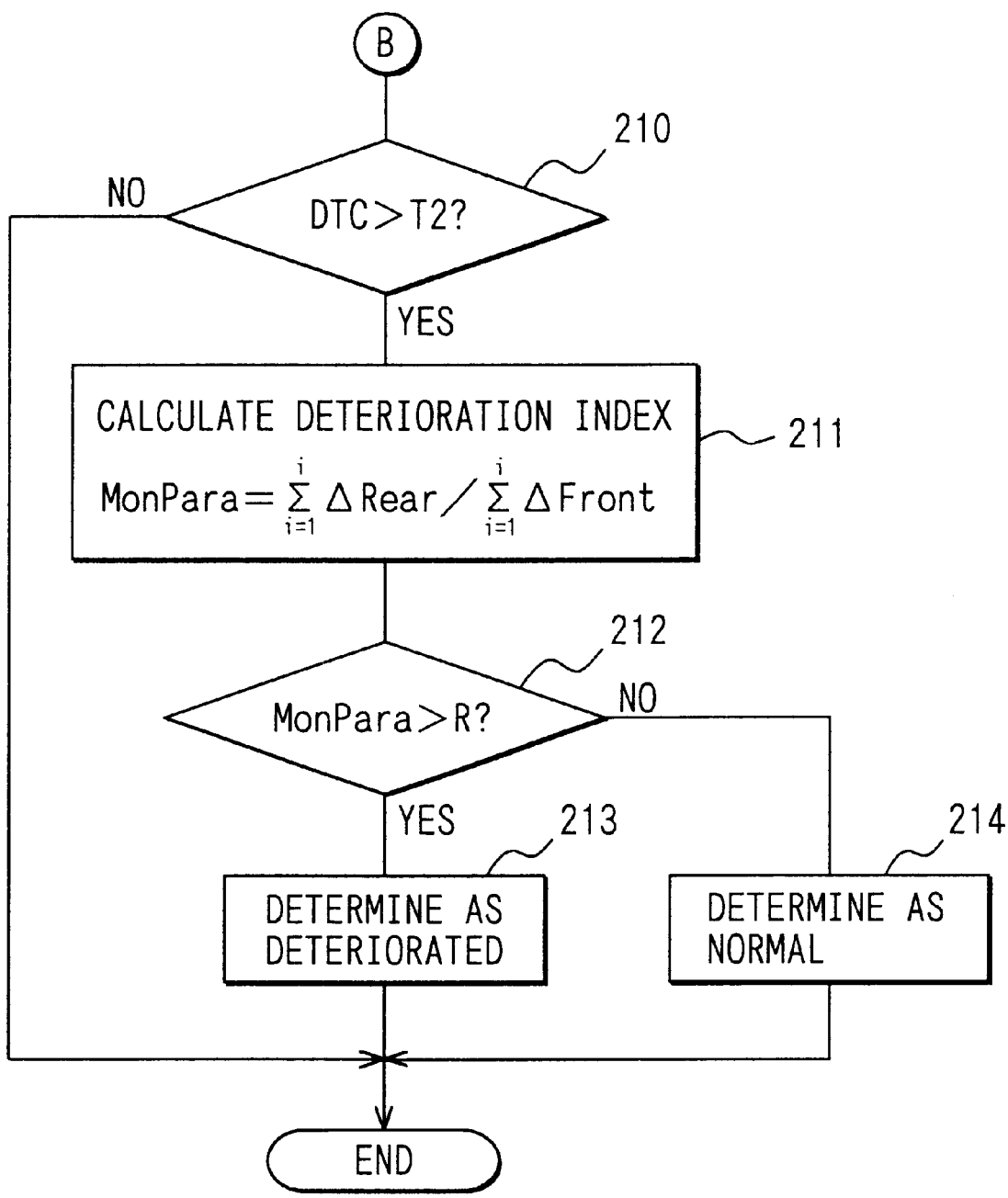
FIG. 5 is a flow diagram showing a third part of the catalyst deterioration diagnosing program executed in the first embodiment.

In addition, the ECU 31 functions as a catalyst deterioration diagnosing unit for determining existence or non-existence of the deteriorating state of the upstream-side catalyst 22 by periodically executing a catalyst deterioration diagnosis execution condition determination program represented by a flow diagram shown in FIG. 2 and a catalyst deterioration diagnosing program represented by a flow diagram shown in FIGS. 3 to 5. The catalyst deterioration diagnosis execution condition determination program and the catalyst deterioration diagnosing program are stored in the ROM (storage medium).

The diagnosis of the deteriorating state of the upstream-side catalyst 22 by execution of the catalyst deterioration diagnosis execution condition determination program and the catalyst deterioration diagnosing program is characterized in that the diagnosis is carried out for diagnosing the deteriorating state of the upstream-side catalyst 22 during a period of time in which the third air-fuel ratio sensor 26, that is, a sensor on the downstream side of the downstream-side catalyst 23, is outputting a voltage in a predetermined range.

The diagnosis of the deteriorating state of the upstream-side catalyst 22 is also characterized in that the air-fuel ratio of exhaust gas flowing through the downstream-side catalyst 23 during the period of time to diagnose the deteriorating state of the upstream-side catalyst 22 is sustained at a value in the purifying range of the downstream-side catalyst 23 by setting a target voltage V2t of the second air-fuel ratio sensor 25 in accordance with the voltage output V3 of the third air-fuel ratio sensor 26 so that the voltage output V3 of the third air-fuel ratio sensor 26 is maintained at a value in the predetermined range during the period of time to diagnose the deteriorating state of the upstream-side catalyst 22. The target voltage V2t of the second air-fuel ratio sensor 25 is a target voltage of sub-feedback control.

During a period of time in which a diagnosis of the deteriorating state of the upstream-side catalyst 22 is being carried out, the ECU 31 executes dither control for the diagnosis of the deteriorating state of the upstream-side catalyst 22 to greatly change the air-fuel ratio of exhaust gas periodically from a value on the rich side to a value on the lean side and vice versa by changing the gains of the integral and proportional terms for the sub-F/B correction coefficient FAF2 to large values.

A large difference between existence of the deteriorating state of the upstream-side catalyst 22 and non-existence of the deteriorating state of the upstream-side catalyst 22 appears in the variation of a signal output of the second air-fuel ratio sensor 25. That is, if the upstream-side catalyst 22 deteriorates, the amplitude and the frequency of the signal output of the second air-fuel ratio sensor 25 increase. Thus, the deteriorating state of the upstream-side catalyst 22 can be determined typically by adopting any one of the following methods (1) to (5).

(1) Method Using a Locus Length of a Sensor Output

If the upstream-side catalyst 22 deteriorates, the amplitude and the frequency of the signal output of the second air-fuel ratio sensor 25 increase. A property exhibiting an increasing locus length of a signal output of the second air-fuel ratio sensor 25 is utilized to determine the deteriorating state of the upstream-side catalyst 22.

(2) Method Using the Area of a Sensor Output

The area of a sensor output is a result of integrating the difference between the sensor output and a target value. Due to the deteriorating state of the upstream-side catalyst 22, the frequency and the amplitude of a signal output of the second air-fuel ratio sensor 25 increase. The existence or non-existence of the deteriorating state of the upstream-side catalyst 22 can be determined by utilizing a property exhibiting that the output area of the second air-fuel ratio sensor 25 increases due to the deteriorating state of the upstream-side catalyst 22.

(3) Method Using the Sensor Output's Number of Inversions from the Rich Side to the Lean Side The number of such inversions is represented by an inversion frequency or the reciprocal of an inversion period.

The existence or non-existence of the deteriorating state of the upstream-side catalyst 22 can be determined by utilizing a property exhibiting that the number of inversions from the rich side to the lean side or the inversion frequency of a signal output of the second air-fuel ratio sensor 25 increases due to the deteriorating state of the upstream-side catalyst 22.

(4) Method of Using the Amplitude of a Sensor Output

The existence or non-existence of the deteriorating state of the upstream-side catalyst 22 can be determined by utilizing a property exhibiting that the amplitude of a signal output of the second air-fuel ratio sensor 25 increases due to the deteriorating state of the upstream-side catalyst 22.

In accordance with methods (1) to (4), the existence or non-existence of the deteriorating state of the upstream-side catalyst 22 is determined by using only a value computed from a signal output of the second air-fuel ratio sensor 25. It should be noted, however, that the existence or non-existence of the deteriorating state of the upstream-side catalyst 22 can also be determined from a result of a comparison of a value computed from a signal output of the second air-fuel ratio sensor 25 with a value computed from a signal output of the first air-fuel ratio sensor 24 in order to eliminate effects of variations in signal output of the first air-fuel ratio sensor 24.

(5) Method of Using a Response Delay Time of a Sensor

If the upstream-side catalyst 22 deteriorates, the storage quantity of the upstream-side catalyst 22 (that is, the amount of the absorbed exhaust gas component in a saturated state) decreases. Thus, the quantity of the exhaust gas component which is not purified by the upstream-side catalyst 22 and, hence, passes through the upstream-side. catalyst 22 increases. Due to this property, a response time delay of the inversion of a signal output of the second air-fuel ratio sensor 25 from a value on the rich side to a value on the lean side or vice versa relative the inversion of the target air-fuel ratio λTG from a value on the rich side to a value on the lean side or vice versa respectively is shortened by the deteriorating state of the upstream-side catalyst 22. For this reason, the existence or non-existence of the deteriorating state of the upstream-side catalyst 22 can be determined from determination as to whether the response delay time of the second air-fuel ratio sensor 25 is equal to or smaller than a criterion value R.

The catalyst deterioration diagnosing program shown in FIGS. 3 to 5 determines the existence or non-existence of the deteriorating state of the upstream-side catalyst 22 by adoption of method (1).

[Determination of Conditions for Execution of a Diagnosis]

The catalyst deterioration diagnosis execution condition determination program shown in FIG. 2 is executed repeatedly at predetermined time intervals. First of all, steps 101 to 105 are executed for determining whether conditions for diagnosing the deteriorating state of the upstream-side catalyst 22 are satisfied. Examples of the conditions for execution of a diagnosis of the deteriorating state of the upstream-side catalyst 22 are conditions (1) to (5) listed below.

(1) None of the first air-fuel ratio sensor 24, the second air-fuel ratio sensor 25 and the third air-fuel ratio sensor 26 are abnormal as determined at step 101.
(2) A predetermined operating condition is satisfied as determined at step 102.
(3) The first air-fuel ratio sensor 24, the second air-fuel ratio sensor 25 and the third air-fuel ratio sensor 26 have all been put in an activated state as determined at step 103.
(4) The upstream-side catalyst 22 and the downstream-side catalyst 23 have both been put in an activated state as determined at step 104.
(5) The voltage output V3 by the third air-fuel ratio sensor 26 has a value in a predetermined range (K1<V3<K2) as determined at step 105.

In actuality, the deteriorating state of the upstream-side catalyst 22 can be diagnosed even if the third air-fuel ratio sensor 26 is abnormal provided that the first air-fuel ratio sensor 24 and the second air-fuel ratio sensor 25 are normal. If the deteriorating state of the upstream-side catalyst 22 can be diagnosed when the third air-fuel ratio sensor 26 is abnormal, however, the air-fuel ratio of exhaust gas flowing to the downstream-side catalyst 23 cannot be adjusted to a value in the purifying range of the downstream-side catalyst 23 on the basis of a signal output of the third air-fuel ratio sensor 26. Thus, the rate at which exhaust gas is purified decreases during the period of time to diagnose the deteriorating state of the upstream-side catalyst 22.

For this reason, step 101 is executed to confirm that all of the first air-fuel ratio sensor 24, the second air-fuel ratio sensor 25 and the third air-fuel ratio sensor 26 are normal as condition (1) or the first condition for diagnosing the deteriorating state of the upstream-side catalyst 22. If even one of the first air-fuel ratio sensor 24, the second air-fuel ratio sensor 25 and the third air-fuel ratio sensor 26 is determined to be abnormal, the diagnosis of the deteriorating state of the upstream-side catalyst 22 is inhibited.

The step 102 is executed to confirm that the predetermined operating condition is satisfied as condition (2) or the second condition for diagnosing the deteriorating state of the upstream-side catalyst 22 by confirmation of the fact that, for example, parameters such as the rotational speed of the engine, the speed of the vehicle, a load borne by the engine and the temperature of cooling waters have values in their respective ranges.

If the deteriorating state of the upstream-side catalyst 22 is diagnosed with the first air-fuel ratio sensor 24 and/or the second air-fuel ratio sensor 25 put in an inactive state, the existence or non-existence of the deteriorating state of the upstream-side catalyst 22 cannot be determined with a high degree of precision so that the precision. of the diagnosis of the upstream-side catalyst 22's deteriorating state decreases. If the deteriorating state of the upstream-side catalyst 22 is diagnosed with the third air-fuel ratio sensor 26 put in an inactive state, the air-fuel ratio of exhaust gas flowing to the downstream-side catalyst 23 cannot be adjusted to a value in the purifying range of the downstream-side catalyst 23 with a high degree of precision so that the rate at which exhaust gas is purified decreases.

For these reasons, step 103 is executed to confirm that a predetermined operating condition is satisfied as condition (3) or the third condition for diagnosing the deteriorating state of the upstream-side catalyst 22 by confirmation of the fact that none of the first air-fuel ratio sensor 24, the second air-fuel ratio sensor 25 and the third air-fuel ratio sensor 26 are put in an inactivated state. If even only one of the first air-fuel ratio sensor 24, the second air-fuel ratio sensor 25 and the third air-fuel ratio sensor 26 is put in an inactivated state, the diagnosis of the deteriorating state of the upstream-side catalyst 22 is inhibited.

If the upstream-side catalyst 22 is put in an inactive state, the purifying power of the upstream-side catalyst 22 also decreases as well. Thus, when the deteriorating state of the upstream-side catalyst 22 is diagnosed in the inactive state, it will be likely that the deteriorating state of the upstream-side catalyst 22 is determined to exist even if the upstream-side catalyst 22 is normal. Similarly, if the downstream-side catalyst 23 is put in an inactive state, the purifying power of the downstream-side catalyst 23 also decreases as well. Thus, during the period of time to diagnose the deteriorating state of the upstream-side catalyst 22, the downstream-side catalyst 23 is not capable of compensating the upstream-side catalyst 22 for a decrease in an exhaust gas purifying rate due to the diagnosis of the deteriorating state of the upstream-side catalyst 22.

For this reason, step 104 is executed to confirm that a predetermined operating condition is satisfied as condition (4) or the fourth condition for diagnosing the deteriorating state of the upstream-side catalyst 22 by confirmation of the fact that the upstream-side catalyst 22 and the downstream-side catalyst 23 have both been put in an activated state. If even only one of the upstream-side catalyst 22 and the downstream-side catalyst 23 has been put in an inactivated state, the diagnosis of the deteriorating state of the upstream-side catalyst 22 is inhibited. It should be noted that, in order to determine whether the upstream-side catalyst 22 and the downstream-side catalyst 23 have both been put in an activated state, it is necessary to determine whether the temperatures of both the upstream-side catalyst 22 and the downstream-side catalyst 23 are each in an activation-temperature range. The temperatures of both the upstream-side catalyst 22 and the downstream-side catalyst 23 are detected by the first temperature sensor 27 and the second temperature sensor 28, respectively.

The step 105 is executed to confirm that a predetermined operating condition is satisfied as condition (5) or the fifth condition for diagnosing the deteriorating state of the upstream-side catalyst 22 by confirmation of the fact that that the voltage output V3 of the third air-fuel ratio sensor 26 has a value in a predetermined range (K1<V3<K2), that is, the air-fuel ratio of exhaust gas flowing to the downstream-side catalyst 23 has a value in the purifying range of the downstream-side catalyst 23. Thus, by confirming that the air-fuel ratio of exhaust gas flowing to the downstream-side catalyst 23 has a value in the purifying range of the downstream-side catalyst 23 as condition (5) or the fifth condition for diagnosing the deteriorating state of the upstream-side catalyst 22, the deteriorating state of the upstream-side catalyst 22 can be diagnosed during a period of time in which the air-fuel ratio of exhaust gas flowing to the downstream-side catalyst 23 is controlled to a value in the purifying range of the downstream-side catalyst 23.

If the first to fifth conditions (1) to (5) for diagnosing the deteriorating state of the upstream-side catalyst 22 are all satisfied, the procedure proceeds to step 106 at which a execution flag is set to 1. If either one of the first to fifth conditions (1) to (5) for diagnosing the deteriorating state of the upstream-side catalyst 22 are satisfied, on the other hand, the procedure proceeds to step 107 at which the execution flag is reset to 0.

[Catalyst Deterioration Diagnosis]

The catalyst deterioration diagnosing program shown in FIGS. 3 to 5 is executed repeatedly at predetermined time intervals. When this catalyst deterioration diagnosing program is executed, the flow diagram starts with step 201 at which an output variation ΔFront(i) of the first air-fuel ratio sensor 24 between the immediately preceding processing and the current processing is computed as the absolute value of a difference between the current output V1(i) and the immediately preceding output V1(i−1) as follows:

$$\Delta Font(i)=|V1(i)-V1(i-1)|$$

Then, at the next step 202, an output variation ΔRear(i) of the second air-fuel ratio sensor 25 between the immediately preceding processing and the current processing is computed as the absolute value of a difference between the current output V2(i) and the immediately preceding output V2(i−1) as follows:

$$\Delta Rear(i)=|V2(i)-V2(i-1)|$$

The program then proceeds to step 203 to determine whether the execution flag is set at 1 in order to determine whether the conditions for diagnosing the deteriorating state of the upstream-side catalyst 22 are satisfied. If the conditions for diagnosing the deteriorating state of the upstream-side catalyst 22 are not satisfied, the execution of the program ends without carrying out subsequent processing.

If the conditions for diagnosing the deteriorating state of the upstream-side catalyst 22 are satisfied, on the other hand, the program proceeds to step 204 at which the contents of a determination time counter for measuring the length of a time lapsing since satisfaction of the conditions for diagnosing the deteriorating state of the upstream-side catalyst 22 are incremented. Then, the flow of program proceeds to step 205 to determine whether the count of the determination time counter have reached a predetermined cumulative start time of typically 5 seconds. If the count of the determination time counter have not reached the predetermined cumulative start time, the execution of the program ends. Subsequent processing is not carried out till the count of the determination time counter DTO reach the predetermined cumulative start time T1 (e.g., 5 seconds). In this way, the subsequent processing is delayed for a while till the voltage output V3 of the third air-fuel ratio sensor 26 is stabilized at a value in a predetermined range, that is, till K1<V3<K2.

Later on, at the time the result of determination obtained at step 205 indicates that the count of the determination time counter DTO reach the predetermined cumulative start time T1, that is, the voltage output V3 of the third air-fuel ratio sensor 26 is stabilized at a value in the predetermined range or the air-fuel ratio of exhaust gas flowing through the downstream-side catalyst 23 is stabilized at a value in the purifying range of the downstream-side catalyst 23, the program proceeds to step 206 of the flow diagram shown in FIG. 4. At step 206, a target voltage V2t of the second air-fuel ratio sensor 25 is computed by using a map in dependence on the voltage output V3 of the third air-fuel ratio sensor 26. The map is a relation between the voltage output V3 of the third air-fuel ratio sensor 26 and the target voltage V2t of the second air-fuel ratio sensor 25 which is used as a target voltage of the sub-feedback control.

In this case, in accordance with the map prepared for the target voltage V2t of the second air-fuel ratio sensor 25, for K1<V3<K2, that is, for exhaust gas flowing through the downstream-side catalyst 23 at an air-fuel ratio with a value in a predetermined range, as the voltage output V3 of the third air-fuel ratio sensor 26 increases (becomes rich), the target voltage V2t of the second air-fuel ratio sensor 25 decreases (becomes lean). In addition, in a region where the voltage output V3 of the third air-fuel ratio sensor 26 is lower than the predetermined value K1, the target voltage V2t of the second air-fuel ratio sensor 25 is set at a fixed upper limit. In a region where the voltage output V3 of the third air-fuel ratio sensor 26 is higher than the predetermined value K2, the target voltage V2t of the second air-fuel ratio sensor 25 is set at a fixed lower limit. In this way, the target voltage V2t of the second air-fuel ratio sensor 25 is set at such a value that the air-fuel ratio of exhaust gas flowing through the downstream-side catalyst 23 has a value in the purifying range of the downstream-side catalyst 23.

Then, at the next step 207, the gain of the proportional term of the sub-F/B correction coefficient FAF2 and the gain of the integral term of the sub-F/B correction coefficient FAF2 are each changed to a large value, and execution dither control for diagnosing the deteriorating state of the upstream-side catalyst 22 is started to greatly change the air-fuel ratio of exhaust gas from a value on the rich side to a value on the lean side and vice versa at fixed time intervals. As a result, a large difference between existence of the deteriorating state of the upstream-side catalyst 22 and non-existence of the deteriorating state of the upstream-side catalyst 22 appears in the variation of a signal output of the second air-fuel ratio sensor 25. At that time, the changes in gains of the proportional and integral terms can be set at the same value or different values.

Then, at the next step 208, the first air-fuel ratio sensor output variation is integrated, that is, the output variation ΔFront(i) of the first air-fuel ratio sensor 24 is computed to be added to an output variation integrated value ΣΔFront as follows:

$$\Sigma\Delta Front=\Sigma\Delta Front+\Delta Front(i)$$

Subsequently, at the next step 209, the output variation ΔRear(i) of the second air-fuel ratio sensor 25 is computed to be added to an output variation integrated value ΣΔRear as follows:

$$\Sigma\Delta Rear=\Sigma\Delta Rear+\Delta Rear(i)$$

Then, the program proceeds to step 210 of the flow diagram shown in FIG. 5 to determine whether the count of the determination time counter have reached a predetermined integration end time T2 (e.g., 30 seconds). If the count of the determination time counter have not reached the predetermined integration end time T2, the execution of the program ends without carrying out subsequent processing. Some time later, when the count of the determination time counter reach the predetermined integration end time T2, however, the program proceeds to step 211 at which a catalyst deterioration index MonPara is computed as shown below. The catalyst deterioration index MonPara is the magnitude of the output variation integrated value ΣΔRear of the second air-fuel ratio sensor 25 relative to the magnitude of the output variation integrated value E .ΔFront of the first air-fuel ratio sensor 24.

MonPara=ΣΔRear/ΣΔFront

Subsequently, the program proceeds to step 212 at which the catalyst deterioration index MonPara is compared with a predetermined criterion value R. If the catalyst deterioration index MonPara is found equal to or smaller than the predetermined criterion value R, the program proceeds to step 214 at which the upstream-side catalyst 22 is determined to be normal. If the catalyst deterioration index MonPara is greater than the predetermined criterion value R, on the other hand, the program proceeds to step 213 at which the upstream-side catalyst 22 is determined as deteriorated.

The upstream-side catalyst diagnosis operation of the first embodiment is shown in FIG. 6. During the period of time to diagnose the deteriorating state of the upstream-side catalyst 22, dither control for the diagnosis of the deteriorating state of the catalyst 24 is executed. Since a large difference between existence of the deteriorating state of the upstream-side catalyst 22 and non-existence of the deteriorating state of the upstream-side catalyst 22 appears in the variation of the signal output V2 of the second air-fuel ratio sensor 25, the diagnosis of the deteriorating state of the catalyst 24 can be carried out with a high degree of precision. However, the exhaust gas purifying rate of the upstream-side catalyst 22 is lower than that of the ordinary control.

Conventionally, as shown by dotted lines in FIG. 6, during the period of time to diagnose the deteriorating state of the upstream-side catalyst 22, the voltage output V3 of the third air-fuel ratio sensor 26 may change beyond a predetermined range between K1 and K2, causing the air-fuel ratio of exhaust gas flowing through the downstream-side catalyst 23 to deviate from the purifying range of the downstream-side catalyst 23. Thus, the downstream-side catalyst 23 is not capable of compensating the upstream-side catalyst 22 for a decrease in an exhaust gas purifying rate. As a result, it is likely that the exhaust emission becomes worse.

As shown by solid lines in FIG. 6, on the other hand, in the first embodiment, the deteriorating state of the upstream-side catalyst 22 is diagnosed during a period of time in which the third air-fuel ratio sensor 26 is outputting the voltage V3 in the predetermined range, and the target voltage V2t of the second air-fuel ratio sensor 25, that is, the target voltage of the sub-feedback control, is set in accordance with the voltage output V3 of the third air-fuel ratio sensor 26 so as to maintain the voltage output V3 of the third air-fuel ratio sensor 26 in the predetermined range. Thus, the air-fuel ratio of exhaust gas flowing through the downstream-side catalyst 23 can be sustained at a value in the purifying range of the downstream-side catalyst 23 with a high degree of reliability during the period of time to diagnose the deteriorating state of the upstream-side catalyst 22.

As a result, even if the exhaust gas purifying rate of the upstream-side catalyst 22 decreases, causing the amount of the unpurified gas component passing through the upstream-side catalyst 22 to increase during the period of time to diagnose the deteriorating state of the upstream-side catalyst 22, the unpurified gas component be removed by the downstream-side catalyst 23 with a high degree of efficiency. It is thus possible to prevent the exhaust gas emission from worsening while the existence or non-existence of the deteriorating state of the upstream-side catalyst 22 is being determined.

In addition, in this first embodiment, the diagnosis of the deteriorating state of the upstream-side catalyst 22 is started after the voltage output V3 of the third air-fuel ratio sensor 26 is sustained in the predetermined range for a predetermined period of time (integration start time). The diagnosis of the deteriorating state of the upstream-side catalyst 22 is started after confirmation of stabilization of the air-fuel ratio of exhaust gas flowing through the downstream-side catalyst 23 at a value in the purifying range of the downstream-side catalyst 23. As a result, the exhaust gas purifying rate during the period of time to diagnose the deteriorating state of the upstream-side catalyst 22 can be improved with a high degree of reliability.

In the first embodiment, the temperatures of the upstream-side catalyst 22 and the downstream-side catalyst 23 are monitored by the first temperature sensor 27 and the second temperature sensor 28, respectively. It should be noted, however, that the temperatures of the upstream-side catalyst 22 and the downstream-side catalyst 23 can also be inferred from, among other information, the temperature of the cooling water and a time lapsing since the start.

Second Embodiment

As described above, if dither control for a diagnosis of the deteriorating state of the upstream-side catalyst 22 is executed during a period of time in which the diagnosis is carried out, it is possible to produce a large difference between existence of the deteriorating state of the upstream-side catalyst 22 and non-existence of the deteriorating state of the upstream-side catalyst 22 appearing in the variation of a signal output of the second air-fuel ratio sensor 25. Thus, the deteriorating state of the upstream-side catalyst 22 can be diagnosed with a higher degree of precision. Since the purifying power of a catalyst is not that high when the temperature of a catalyst is not so high during a period of time in which the catalyst is being warmed up, however, if controlled variables of the dither control for a diagnosis of the deteriorating state of a catalyst are increased, the quantity of an unpurified gas component passing through the upstream-side catalyst 22 rises, resulting in possibility that the downstream-side catalyst 23 is no longer capable of removing the unpurified gas component. The controlled variables are the proportional and integral terms of the sub-F/B correction coefficient FAF2.

Figure 7:
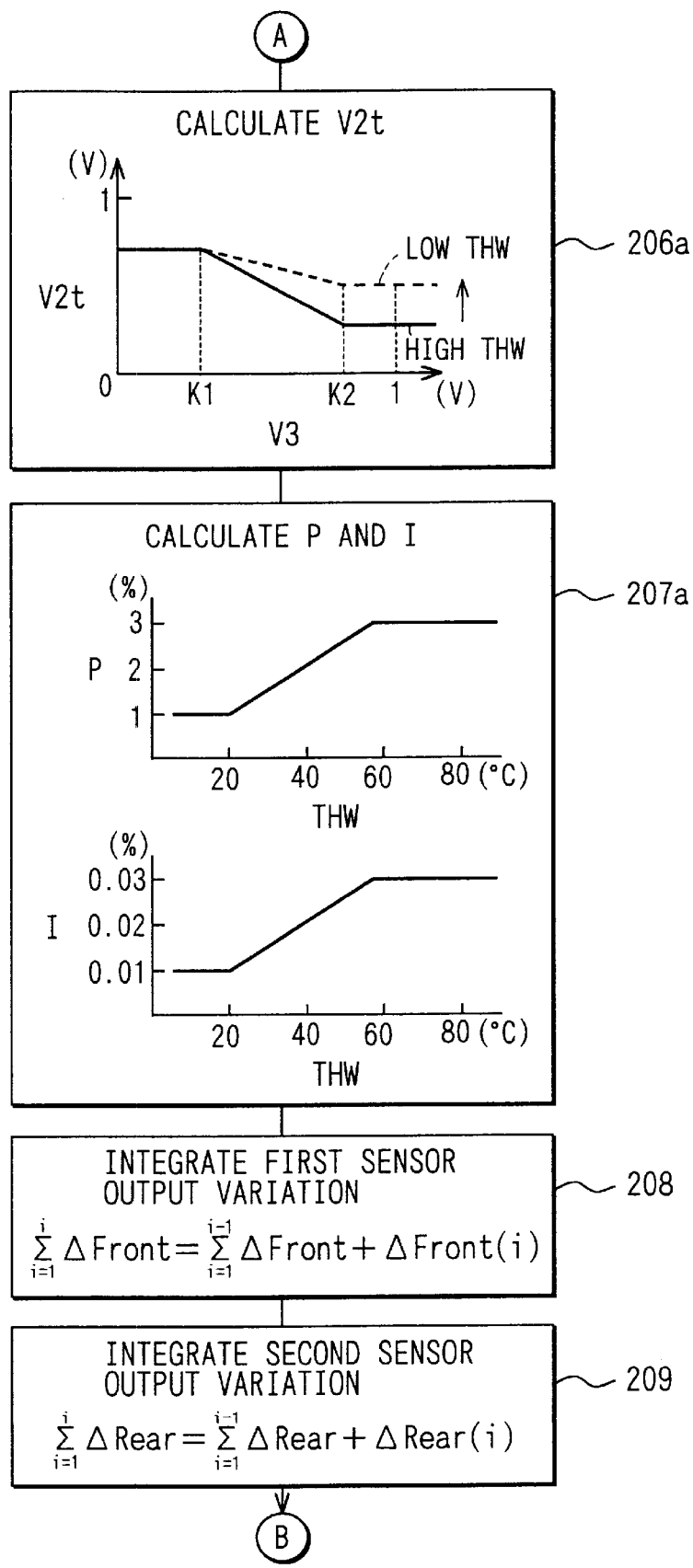
FIG. 7 is a flow diagram showing a main part of a catalyst deterioration diagnosing program executed in a second embodiment of the present invention.

In a second embodiment shown in FIG. 7, the proportional and integral terms of the sub-F/B correction coefficient FAF2 are changed in accordance with the temperature THW of the cooling water which is information used as a substitute for the temperature of the catalyst. Thus, controlled variables of the dither control for a diagnosis of the deteriorating state of a catalyst are varied in accordance with the purifying power of catalyst which varies with the temperature of the catalyst.

In the second embodiment, a routine shown in FIG. 7 is executed in place of the routine shown in FIG. 4 as a part of the catalyst deterioration diagnosing program shown in FIGS. 3 to 5 in the first embodiment. To be more specific, steps 206a and 207a of the routine in FIG. 7 replace respectively steps 206 and 207 of the routine shown in FIG. 4 for the first embodiment.

The rest of the routine in FIG. 7 is the same as the routine shown in FIG. 4.

A target voltage V2t of the second air-fuel ratio sensor 25 is calculated from the voltage output V3 of the third air-fuel ratio sensor 26 by taking the temperature THW of cooling water into consideration at step 206a of the program shown in FIG. 7. The target voltage V2t is calculated by using a two-dimensional map showing a relation between the target voltage V2t of the second air-fuel ratio sensor 25 and the voltage output V3 of the third air-fuel ratio sensor 26 with the temperature THW of the cooling water used as a parameter. Thus, the target voltage V2t for the voltage output V3 of the third air-fuel ratio sensor 26 and a temperature of the cooling water are found from the two-dimensional map.

In general, the exhaust gas purifying rate of a catalyst decreases at low temperatures of the catalyst. The degree, to which the exhaust gas purifying rate of catalyst for rich and lean components decreases, varies in dependence on specifications of the catalyst. That is, there is a catalyst with specifications prescribing that the exhaust gas purifying rate of catalyst for rich components such as HC and CO decreases substantially at low temperatures more than the exhaust gas purifying rate of catalyst for lean components such as NOx does. On the other hand, there is a catalyst with specifications prescribing that the exhaust gas purifying rate of catalyst for lean components decreases substantially at low temperatures more than the exhaust gas purifying rate of catalyst for rich components does. In a map used to find a target value of the second air-fuel ratio sensor 25 for a catalyst with specifications prescribing that the exhaust gas purifying rate of catalyst for lean components decreases substantially at low temperatures more than the exhaust gas purifying rate of catalyst for rich components does, the target voltage V2t of the second air-fuel ratio sensor 25 changes to a value on the lean side as the temperature of the cooling water decreases. In this way, even for a low temperature of the catalyst, the air-fuel ratio of exhaust gas flowing through the downstream-side catalyst 23 can be controlled to an air-fuel ratio sufficiently displaying the purifying power of the downstream-side catalyst 23. It should be noted that the target voltage V2t of the second air-fuel ratio sensor 25 can be varied in accordance with the temperature of the catalyst and the time lapsing since the start instead of the temperature of the cooling water.

After the target voltage V2t of the second air-fuel ratio sensor 25 is calculated, the program proceeds to step 207a at which the proportional term P of the sub-F/B correction coefficient is calculated for the present temperature of the cooling water from a map showing a relation between the temperature THW of the cooling water and the proportional term of the sub-F/B correction coefficient. In addition, the integral term I of the sub-F/B correction coefficient is calculated for the present temperature THW of the cooling water from a map showing a relation between the temperature of the cooling water and the integral term I of the sub-F/B correction coefficient.

In accordance with the map showing a relation between the temperature THW of the cooling water and the proportional term P of the sub-F/B correction coefficient wherein the temperature of the cooling water is information serving as a substitute for the temperature of the catalyst, for the cooling water temperatures in a predetermined range, the proportional term P increases as the temperature of the cooling water rises. For the cooling water temperatures lower than the predetermined range, the proportional term P has a fixed value equal to a lower limit. For the cooling water temperatures higher than the predetermined range, on the other hand, the proportional term P has a fixed value equal to an upper limit.

Also in accordance with the map showing a relation between the temperature THW of the cooling water and the integral term I of the sub-F/B correction coefficient wherein the temperature THW of the cooling water is information serving as a substitute for the temperature of the catalyst, for the cooling water temperatures in a predetermined range, the integral term I increases as the temperature THW of the cooling water rises. For the cooling water temperatures lower than the predetermined range, the integral term I has a fixed value equal to a lower limit. For the cooling water temperatures higher than the predetermined range, on the other hand, the integral term I has a fixed value equal to an upper limit.

The maps are used to find proportional and integral terms serving as controlled variables of the dither control for a diagnosis of the deteriorating state of a catalyst in accordance with the purifying power of catalyst which varies with the temperature of the catalyst. It should be noted that the proportional and integral terms can also be changed in accordance with the temperature of the catalyst and the time lapsing since the start instead of the temperature of the cooling water.

Then, at the next step 208, the output variation $\Delta Front(i)$ of the first air-fuel ratio sensor 24 is computed to be added to an output variation integrated value $\Sigma \Delta Front$ as follows:

$$\Sigma \Delta Front = \Sigma \Delta Front + \Delta Front(i)$$

Subsequently, at the next step 209, the output variation $\Delta Rear(i)$ of the second air-fuel ratio sensor 25 is computed to be added to an output variation integrated value $\Sigma \Delta Rear$ as follows:

$$\Sigma \Delta Rear = \Sigma \Delta Rear + \Delta Rear(i)$$

In the second embodiment, the proportional and integral terms of the sub-F/B correction coefficient FAF2 are changed in accordance with the temperature THW of the cooling water or in accordance with the temperature of the catalyst and the time lapsing since the start in order to vary the controlled variables of the dither control for a diagnosis of the deteriorating state of a catalyst in accordance with the purifying power of catalyst which varies with the temperature of the catalyst. The temperature of the catalyst and the time lapsing since the start are information serving as a substitute for the temperature of the catalyst. Thus, the dither control for a diagnosis of the deteriorating state of the catalyst can be executed in a range not exceeding the purifying power of the downstream-side catalyst 23. As a result, the exhaust gas purifying rate can be improved while the deteriorating state of the catalyst is being diagnosed at as a high degree of precision as possible even during the warming-up time of the catalyst.

It is also possible to select either execution or inhibition of the dither control for a diagnosis of the deteriorating state of the catalyst in accordance with the temperature of the catalyst (or the temperature of the catalyst and the time lapsing since the start).

Third Embodiment

A diagnosis of the deteriorating state of the upstream-side catalyst 22 is carried out on the basis of at least a signal output of the second air-fuel ratio sensor 25 on the downstream side of the upstream-side catalyst 22. There is a displayed property that the signal output of the second air-fuel ratio sensor 25 varies alternately from a value on the rich side to a value on the lean side and vice versa with the target voltage V2t of the second air-fuel ratio sensor 25 serving as the center of the variation as shown in FIG. 6. In addition, the amplitude of the variation changes in accordance with the degree of the deteriorating state of the upstream-side catalyst 22 as well as in accordance with the target voltage V2t of the second air-fuel ratio sensor 25. This is because the variation characteristic of a signal output of an oxygen sensor used as the second air-fuel ratio sensor 25 is not linear with respect to the air-fuel ratio.

If the amplitude of the variation of a signal output of the second air-fuel ratio sensor 25 changes in accordance with the target voltage V2t of the second air-fuel ratio sensor 25, the output variation integrated value ΣΔRear of the second air-fuel ratio sensor 25 varies, resulting in a change in catalyst deterioration index MonPara (=ΣΔRear/ΣΔFront).

Figure 8:
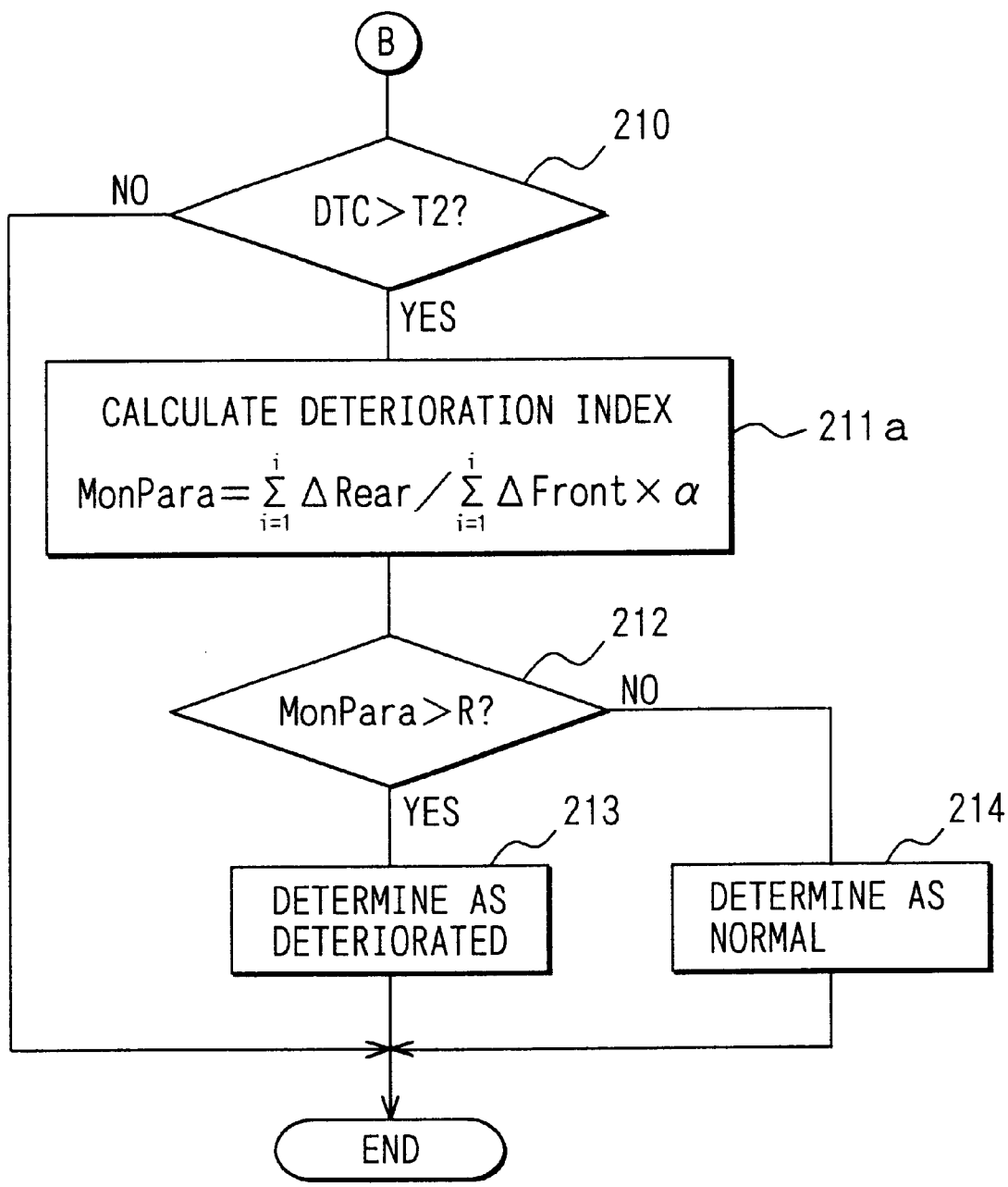
FIG. 8 is a flow diagram showing a main part of a catalyst deterioration diagnosing program executed in a third embodiment of the present invention.
Figure 9:
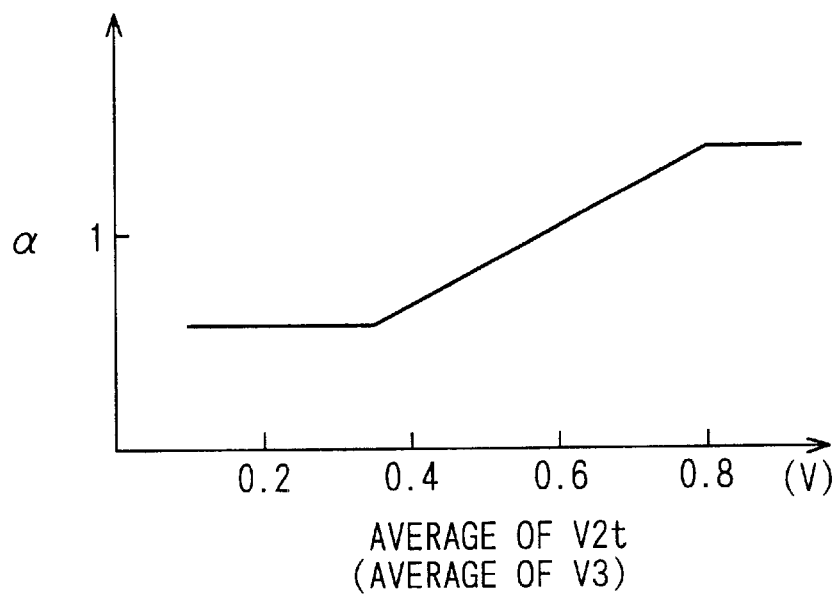
FIG. 9 is a diagram showing a typical map of a catalyst deterioration index correction coefficient.

In the third embodiment shown in FIGS. 8 and 9, in order to eliminate influence of the target voltage V2t of the second air-fuel ratio sensor 25, the catalyst deterioration index MonPara is corrected in accordance with the target voltage V2t of the second air-fuel ratio sensor 25.

In the third embodiment, a routine shown in FIG. 8 is executed in place of a routine shown in FIG. 5 as a part of the catalyst deterioration diagnosing program shown in FIGS. 3 to 5 in the first embodiment. To be more specific, step 211a of the routine shown in FIG. 7 replaces step 211 of the routine shown in FIG. 5 for the first embodiment. The rest of the routine shown in FIG. 8 is the same as the routine shown in FIG. 5.

In the program shown in FIG. 8, if the result of determination obtained at step 210 indicates that the count of the determination time counter DTC have reached the integration end time T2, the program proceeds to step 211a at which the ratio of the output variation integrated value ΣΔRear of the second air-fuel ratio sensor 25 to the output variation integrated value ΣΔFront of the first air-fuel ratio sensor 24 is multiplied by a catalyst deterioration index correction coefficient α to give a catalyst deterioration index MonPara as follows:

MonPara=ΣΔRear/ΣΔFront×α

The catalyst deterioration index correction coefficient Δ is found for an average value of target voltages of the second air-fuel ratio sensor 25 from a map shown in FIG. 9. The map of FIG. 9 for the catalyst deterioration index correction coefficient α is created by considering output characteristics of an oxygen sensor serving as the second air-fuel ratio sensor 25. In accordance with the map, for target voltage average values of the second air-fuel ratio sensor 25 in a predetermined range, the catalyst deterioration index correction coefficient α increases as the target voltage average value of the second air-fuel ratio sensor 25 rises.

For target voltage average values lower than the predetermined range, the catalyst deterioration index correction coefficient α has a fixed value equal to a lower limit. For target voltage average values higher than the predetermined range, the catalyst deterioration index correction coefficient α has a fixed value equal to an upper limit. Thus, a catalyst deterioration index correction coefficient α for correcting the catalyst deterioration index MonPara can be found to keep up with a change in variation width or amplitude of a signal output of the second air-fuel ratio sensor 25 with a variation in target voltage, V2t of the second air-fuel ratio sensor 25.

It should be noted that, since the target voltage V2t of the second air-fuel ratio sensor 25 is set at a value according to the voltage output V3 of the third air-fuel ratio sensor 26, an average value of voltages output by the third air-fuel ratio sensor 26 is used in place of an average value of target voltages of the second air-fuel ratio sensor 25, and a catalyst deterioration index correction coefficient α is then computed in accordance with the average value of voltages output by the third air-fuel ratio sensor 26.

After the catalyst deterioration index MonPara is found, the catalyst deterioration index MonPara is compared with a predetermined deterioration criterion value R. If the catalyst deterioration index MonPara is found equal to or smaller than the predetermined deterioration criterion value R, the upstream-side catalyst 22 is determined to be normal. If the catalyst deterioration index MonPara is found greater than the predetermined deterioration criterion value R, on the other hand, the upstream-side catalyst 22 is determined to be deteriorated (steps 212 and 213).

In the third embodiment, since the catalyst deterioration index MonPara is corrected in accordance with the target voltage V2t of the second air-fuel ratio sensor 25 by considering the fact that the variation width (amplitude) of a signal output of the second air-fuel ratio sensor 25 varies in accordance with the target value of the second air-fuel ratio sensor 25, the catalyst deterioration index MonPara can be corrected to a proper value in accordance with variations in target voltage V2t of the second air-fuel ratio sensor 25, allowing the deteriorating state of the upstream-side catalyst 22 to be diagnosed with a higher degree of precision.

Figure 10:
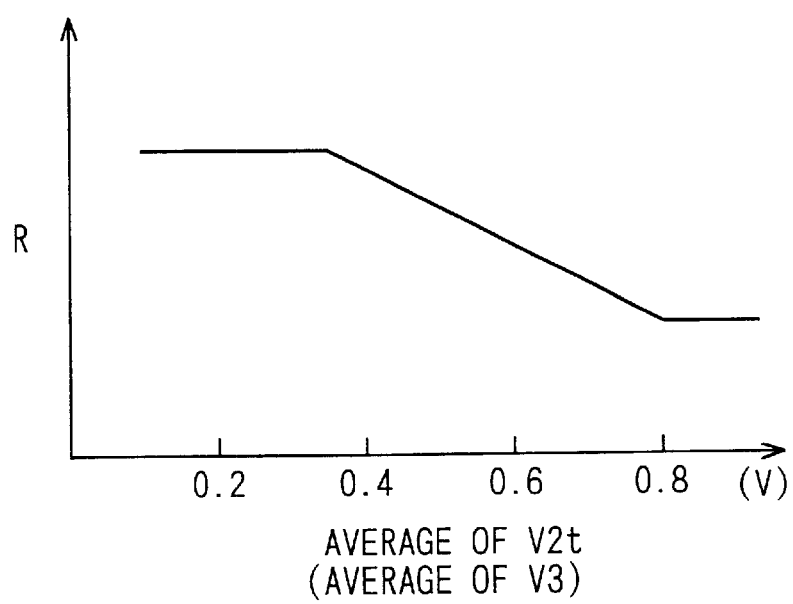
FIG. 10 is a diagram showing a typical map of a deterioration criterion value.

In the third embodiment, the catalyst deterioration index MonPara is corrected in accordance with an average value of the target voltages of the second air-fuel ratio sensor 25. It should be noted, however, that the deterioration criterion value R can also be corrected in accordance with an average value of the target voltages of the second air-fuel ratio sensor 25 (or average value of voltages output by the third air-fuel ratio sensor 26) by using a map shown in FIG. 10 as an alternative. That is, a condition for determining the deteriorating state of the upstream-side catalyst 22 needs to be corrected in accordance with the target voltage V2t of the second air-fuel ratio sensor 25.

In addition, in the first to third embodiments, an air-fuel ratio sensor is used as the first air-fuel ratio sensor 24 while oxygen sensors are used as the second air-fuel ratio sensor 25 and the third air-fuel ratio sensor 26. It should be noted, however, that linear output-type air-fuel ratio sensors can also be used as the second air-fuel ratio sensor 25 and the third air-fuel ratio sensor 26. of course, all the first air-fuel ratio sensor 24, the second air-fuel ratio sensor 25 and the third air-fuel ratio sensor 26 can be implemented by stepwise output-type oxygen sensors.

Fourth Embodiment

The first to third embodiments each has a configuration wherein two catalysts, that is, the upstream-side catalyst 22 and the downstream-side catalyst 23, are provided in series on the exhaust pipe 21 common to all cylinders, and sensors such as air-fuel ratio sensors and oxygen sensors are installed on the upstream and downstream sides of the upstream-side catalyst 22 and the downstream side of the downstream-side catalyst 23.

Figure 11:
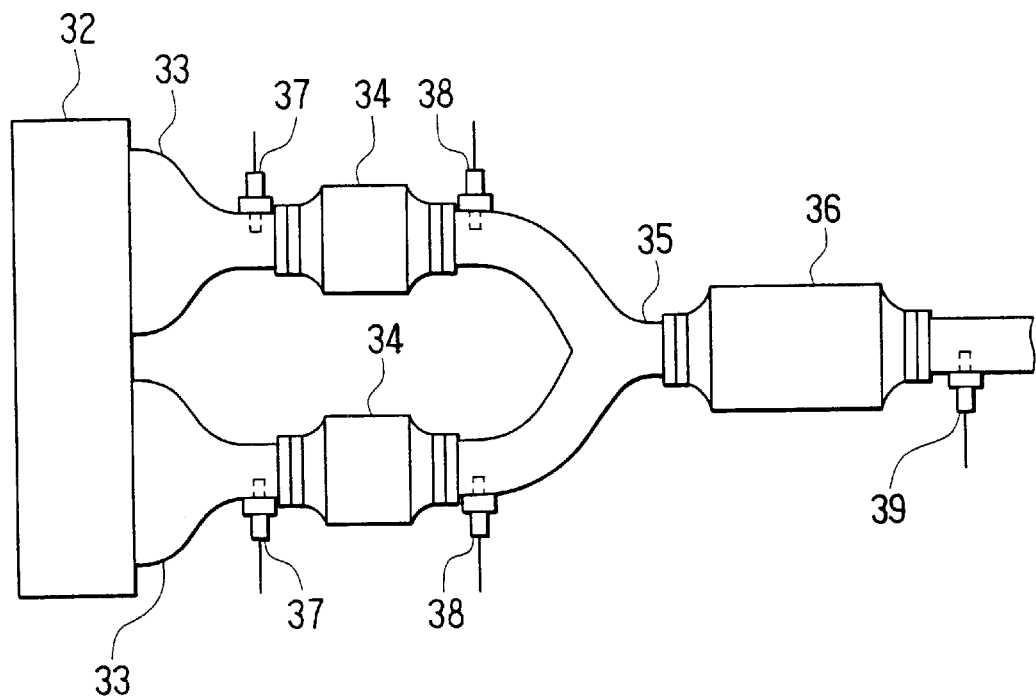
FIG. 11 is a schematic diagram showing an exhaust system to which a fourth embodiment of the present invention is applied.

On the other hand, a fourth embodiment shown in FIG. 11 has a configuration wherein an exhaust pipe 33 is provided for each group of cylinders of the engine 32. An upstream-side catalyst 34 is installed on each of the exhaust pipes 33. A downstream-side catalyst 36 is provided on a joint exhaust pipe 35. A first sensor 37 such as an air-fuel ratio sensor or an oxygen sensor is installed on the upstream side of each of the upstream-side catalysts 34. A second sensor 38 such as an air-fuel ratio sensor or an oxygen sensor is installed on the downstream side of each of the upstream-side catalysts 34. A third sensor 39 such as an air-fuel ratio sensor or an oxygen sensor is installed on the downstream side of the downstream-side catalysts 36. In the case of a V-type engine, the group of cylinders is a bank of the engine. The joint exhaust pipe 35 is a pipe where the upstream-side pipes 34 merge.

Also in the configuration of the fourth embodiment, by execution of the catalyst deterioration diagnosing program of the first to third embodiments, a gas component not removed by the upstream-side catalysts 34 can be eliminated by the downstream-side catalyst 36 with a high degree of efficiency while the deteriorating state of the upstream-side catalysts 34 is being improved. As a result, exhaust emission can be prevented from worsening during the period of time to diagnose deteriorating states of the upstream-side catalysts 34.

Fifth Embodiment

Figure 12:
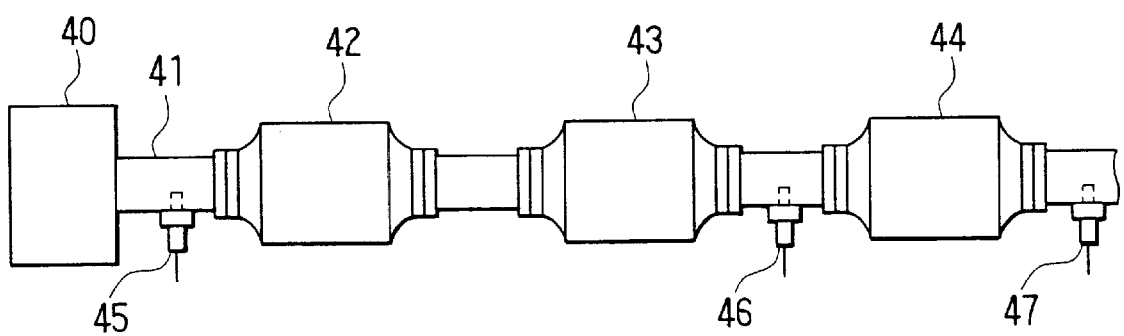
FIG. 12 is a schematic diagram showing an exhaust system to which a fifth embodiment of the present invention is applied.

A fifth embodiment shown in FIG. 12 has a configuration wherein three or more catalysts 42 to 44 are installed on an exhaust pipe 41 of an engine 40. A first sensor 45 such as an air-fuel ratio sensor or an oxygen sensor is installed on the upstream side of the first catalyst 42 provided on the upstream side of the second catalyst 43. A second sensor 46 such as an air-fuel ratio sensor or an oxygen sensor is provided on the downstream side of the second catalyst 43. A third sensor 47 such as an air-fuel ratio sensor or an oxygen sensor is provided on the downstream side of the third catalyst 44.

Also in the configuration of the fifth embodiment, by execution of the catalyst deterioration diagnosing program of the first to third embodiments, a gas component not removed by the upstream-side catalysts, that is, the first and second catalysts 42 and 43, can be eliminated by the downstream-side catalyst, that is, the third catalyst 44, with a high degree of efficiency while deteriorating states of the upstream-side catalysts 42 and 43 are being improved and, as a result, exhaust emission can be prevented from worsening during the period of time to diagnose the deteriorating states of the upstream-side catalysts 42 and 43.

Other Embodiments

In the first to fifth embodiments, the deteriorating state of an upstream-side catalyst is diagnosed during a period of time in which the third sensor is outputting a voltage in a predetermined range, and the air-fuel ratio is controlled to maintain the voltage output V3 of the third sensor in the predetermined range during the period of time to diagnose the deteriorating state of an upstream-side catalyst. It should be noted, however, that the diagnosis of the deteriorating state of an upstream-side catalyst and the control of the air-fuel ratio can also be executed independently.

In addition, the voltage output of the third sensor can also be reflected in the target voltage of the first sensor and the fuel injection amount.

Furthermore, the present invention is not limited to an exhaust gas purifying system employing a three-way catalyst. The present invention can also be applied to an exhaust gas purifying system employing a combination of a three-way catalyst and another catalyst such as an NOx occlusion/reduction-type catalyst and an exhaust gas purifying system employing only catalysts other than a three-way catalyst.

What is claimed is:

1. A deterioration detection apparatus for detecting deterioration of a catalyst of an engine having an upstream-side catalyst and a downstream-side catalyst provided for purifying exhaust gas, the deterioration detection apparatus comprising:
   a first sensor, provided on an upstream side of the upstream-side catalyst, for detecting an air-fuel ratio of exhaust gas flowing in the upstream side of the upstream-side catalyst;
   a second sensor, provided on a downstream side of the upstream-side catalyst, for detecting an air-fuel ratio of exhaust gas flowing in the downstream side of the upstream-side catalyst;
   a third sensor, provided on a downstream side of the downstream-side catalyst, for detecting an air-fuel ratio of exhaust gas flowing in the downstream-side of the downstream-side catalyst; and
   a catalyst deterioration diagnosing unit for determining existence and non-existence of a deteriorating state of the upstream-side catalyst based on at least a signal output of the second sensor,
   wherein the catalyst deterioration diagnosing unit controls the air-fuel ratio of the exhaust gas flowing in the downstream side of the downstream-side catalyst in a predetermined range during a period of time to diagnose the deteriorating state of the upstream-side catalyst, and wherein the catalyst deterioration diagnosing unit starts the diagnosis of the deteriorating state of the upstream-side catalyst after a signal output of the third sensor has been sustained in the predetermined range for a predetermined period of time continuously.

2. A deterioration detection apparatus as in claim 1, wherein:
   the catalyst deterioration diagnosing unit sets a target voltage of the second sensor in accordance with a signal output of the third sensor during the period of time to diagnose the deteriorating state of the upstream-side catalyst.

3. A deterioration detection apparatus as in claim 1, wherein:
   the catalyst deterioration diagnosing unit corrects a condition for determining the deteriorating state of the upstream-side catalyst in accordance with a target voltage of the second sensor or a signal output of the third sensor during the period of time to diagnose the deteriorating state of the upstream-side catalyst.

4. A deterioration detection apparatus as in claim 1, further comprising:
   a catalyst deterioration diagnosis inhibition unit for inhibiting the catalyst deterioration diagnosing unit from diagnosing the deteriorating state of the upstream-side catalyst when at least one of the first sensor, the second sensor and the third sensor is in an inactive state.

5. A deterioration detection apparatus as in claim 1, wherein:
   the catalyst deterioration diagnosing unit executes a dither control for inverting the air-fuel ratio of exhaust gas from a value on a rich side to a value on a lean side and vice versa periodically when a condition for diagnosing the deteriorating state of the upstream-side catalyst is satisfied during the period of time to diagnose the deteriorating state of the upstream-side catalyst, and determines at least one of (a) a control quantity of the dither control and (b) an execution time of the dither control in accordance with at least one of (a) temperature of the upstream-side catalyst, (b) temperature of the downstream-side catalyst, (c) temperature of cooling water and (d) time lapsing since a start during the period of time to diagnose the deteriorating state of the upstream-side catalyst.

6. A deterioration detection apparatus as in claim 1 wherein:
the upstream-side catalyst, the first sensor and the second sensor are provided on each of a pair of exhaust pipes of the engine; and
the downstream-side catalyst and the third sensor are provided for both of the exhaust pipes in common.

7. A deterioration detection apparatus as in claim 1, wherein:
the upstream-side catalyst includes a plurality of catalysts connected in series in an exhaust pipe of the engine.

8. A deterioration detection apparatus for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a third sensor, provided on a downstream side of the downstream-side catalyst, for detecting an air-fuel ratio of exhaust gas flowing in the downstream side of the downstream-side catalyst;
a catalyst deterioration diagnosing unit for determining existence and non-existence of a deteriorating state of the upstream-side catalyst based on at least a signal output of the second sensor,
wherein the catalyst deterioration diagnosing unit controls the air-fuel ratio of the exhaust gas flowing in the downstream side of the downstream-side catalyst in a predetermined range during a period of time to diagnose the deteriorating state of the upstream-side catalyst,
an upstream-side catalyst temperature determining unit for determining temperature of the upstream-side catalyst; and
a downstream-side catalyst temperature determining unit for determining temperature of the downstream-side catalyst,
wherein the catalyst deterioration diagnosing unit diagnoses the deteriorating state of the upstream-side catalyst only when the temperatures of the upstream-side catalyst and the downstream-side catalyst are in respective predetermined ranges.

9. A deterioration detection apparatus for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a third sensor, provided on a downstream side of the downstream-side catalyst, for detecting an air-fuel ratio of exhaust gas flowing in the downstream side of the downstream-side catalyst;
a catalyst deterioration diagnosing unit for determining existence and non-existence of a deteriorating state of the upstream-side catalyst based on at least a signal output of the second sensor,
wherein the catalyst deterioration diagnosing unit controls the air-fuel ratio of the exhaust gas flowing in the downstream side of the downstream-side catalyst in a predetermined range during a period of time to diagnose the deteriorating state of the upstream-side catalyst, and
a catalyst deterioration diagnosis inhibition unit for inhibiting the catalyst deterioration diagnosing unit from diagnosing the deteriorating state of the upstream-side catalyst when the third sensor becomes abnormal.

10. A deterioration detection apparatus for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a third sensor, provided on a downstream side of the downstream-side catalyst, for detecting an air-fuel ratio of exhaust gas flowing in the downstream side of the downstream-side catalyst; and
a catalyst deterioration diagnosing unit for determining existence and non-existence of a deteriorating state of the upstream-side catalyst based on at least a signal output of the second sensor,
wherein the catalyst deterioration diagnosing unit carries out a diagnosis of the deteriorating state of the upstream-side catalyst during a period of time in which the air-fuel ratio of the exhaust gas flowing in the downstream side of the downstream-side catalyst is controlled in a predetermined range, and
wherein the catalyst deterioration diagnosing unit starts the diagnosis of the deteriorating state of the upstream-side catalyst after a signal output of the third sensor has been sustained in the predetermined range for a predetermined period of time continuously.

11. A deterioration detection apparatus as in claim 10, wherein:
wherein the catalyst deterioration diagnosing unit controls the air-fuel ratio of the exhaust gas flowing in the downstream side of the downstream-side catalyst in the predetermined range during the period of time to diagnose the deteriorating state of the upstream-side catalyst.

12. A deterioration detection apparatus as in claim 10, wherein:
the catalyst deterioration diagnosing unit sets a target voltage of the second sensor in accordance with a signal output of the third sensor during the period of time to diagnose the deteriorating state of the upstream-side catalyst.

13. A deterioration detection apparatus as in claim 10, wherein:
the catalyst deterioration diagnosing unit corrects a condition for determining the deteriorating state of the upstream-side catalyst in accordance with a target voltage of the second sensor or a signal output of the third sensor during the period of time to diagnose the deteriorating state of the upstream-side catalyst.

14. A deterioration detection apparatus as in claim 10, further comprising:
a catalyst deterioration diagnosis inhibition unit for inhibiting the catalyst deterioration diagnosing unit from diagnosing the deteriorating state of the upstream-side catalyst when at least one of the first sensor, the second sensor and the third sensor is in an inactive state.

15. A deteriorating detection apparatus as in claim 10, wherein:
the catalyst deterioration diagnosing unit executes a dither control for inverting the air-fuel ratio of exhaust gas from a value on a rich side to a value on a lean side and vice versa periodically when a condition for diagnosing the deteriorating state of the upstream-side catalyst is satisfied during the period of time to diagnose the deteriorating states of the upstream-side catalyst, and determines at least one of (a) a control quantity of the dither control and (b) an execution time of the dither control in accordance with at least one of (a) temperature of the upstream-side catalyst, (b) temperature of the downstream-side catalyst, (c) temperature of cooling water and (d) time lapsing since a start during the period of time to diagnose the deteriorating state of the upstream-side catalyst.

16. for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a third sensor, provided on a downstream side of the downstream-side catalyst, for detecting an air-fuel ratio of exhaust gas flowing in the downstream side of the downstream-side catalyst;
a catalyst deterioration diagnosing unit for determining existence and non-existence of a deteriorating state of the upstream-side catalyst based on at least a signal output of the second sensor,
wherein the catalyst deterioration diagnosing unit carries out a diagnosis of the deteriorating state of the upstream-side catalyst during a period of time in which the air-fuel ratio of the exhaust gas flowing in the downstream side of the downstream-side catalyst is controlled in a predetermined range,
an upstream-side catalyst temperature determining unit for determining temperature of the upstream-side catalyst; and
a downstream-side catalyst temperature determining unit for determining temperature of the downstream-side catalyst,
wherein the catalyst deterioration diagnosing unit diagnoses the deteriorating state of the upstream-side catalyst only when the temperatures of the upstream-side catalyst and the downstream-side catalyst are in respective predetermined ranges.

17. A deterioration detection apparatus for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a third sensor, provided on a downstream side of the downstream-side catalyst, for detecting an air-fuel ratio of exhaust gas flowing in the downstream side of the downstream-side catalyst;
a catalyst deterioration diagnosing unit for determining existence and non-existence of a deteriorating state of the upstream-side catalyst based on at least a signal output of the second sensor,
wherein the catalyst deterioration diagnosing unit carries out a diagnosis of the deteriorating state of the upstream-side catalyst during a period of time in which the air-fuel ratio of the exhaust gas flowing in the downstream side of the downstream-side catalyst is controlled in a predetermined range,
a catalyst deterioration diagnosis inhibition unit for inhibiting the catalyst deterioration diagnosing unit from diagnosing the deteriorating state of the upstream-side catalyst when the third sensor becomes abnormal.

18. A deterioration detection apparatus for detecting deterioration of a catalyst of an engine having an upstream-side catalyst and a downstream-side catalyst provided for purifying exhaust gas, the deterioration detection apparatus comprising:
a first sensor, provided on an upstream side of the upstream-side catalyst, for detecting an air-fuel ratio of exhaust gas flowing in the upstream side of the upstream-side catalyst;
a second sensor, provided on a downstream side of the upstream-side catalyst, for detecting an air-fuel ratio of exhaust gas flowing in the downstream side of the upstream-side catalyst;
a control unit for effecting an air-fuel ratio feedback control using the air-fuel ratios detected by the first sensor and the second sensor;
a third sensor, provided on a downstream side of the downstream-side catalyst, for detecting an air-fuel ratio of exhaust gas flowing in the downstream side of the downstream-side catalyst; and
a catalyst deterioration diagnosing unit for determining existence and non-existence of a deteriorating state of the upstream-side catalyst based on at least a signal output of the second sensor,
wherein the catalyst deterioration diagnosing unit controls the air-fuel ratio of the exhaust gas flowing in the downstream side of the downstream-side catalyst in a predetermined range during a period of time to diagnose the deteriorating state of the upstream-side catalyst.

19. A deterioration detection apparatus for detecting deterioration of a catalyst of an engine having an upstream-side catalyst and a downstream-side catalyst provided for purifying exhaust gas, the deterioration detection apparatus comprising:

- a first sensor, provided on an upstream side of the upstream-side catalyst, for detecting an air-fuel ratio of exhaust gas flowing in the upstream side of the upstream-side catalyst;
- a second sensor, provided on a downstream side of the upstream-side catalyst, for detecting an air-fuel ratio of exhaust gas flowing in the downstream side of the upstream-side catalyst;
- a control unit for effecting an air-fuel ratio feedback control using the air-fuel ratios detected by the first sensor and the second sensor;
- a third sensor, provided on a downstream side of the downstream-side catalyst, for detecting an air-fuel ratio of exhaust gas flowing in the downstream side of the downstream-side catalyst; and
- a catalyst deterioration diagnosing unit for determining existence and non-existence of a deteriorating state of the upstream-side catalyst based on at least a signal output of the second sensor,
- wherein the catalyst deterioration diagnosing unit carries out a diagnosis of the deteriorating state of the upstream-side catalyst during a period of time in which the air-fuel ratio of the exhaust gas flowing in the downstream side of the downstream-side catalyst is controlled in a predetermined range.

20. A method for detecting deterioration of an upstream side first exhaust emission control catalyst in the presence of a downstream-side second exhaust emission control catalyst, said method comprising:

- determining the temperature of the upstream-side catalyst;
- determining the temperature of the downstream-side catalyst; and
- diagnosing the deterioration state of the upstream-side catalyst when the temperatures of the upstream-side catalyst and the downstream-side catalyst are in respective predetermined ranges.

21. A method for detecting deteriorating of an upstream-side first exhaust emission control catalyst in the presence of a downstream-side second exhaust emission control catalyst, said method comprising:

- detecting an air-fuel ratio of exhaust gas flowing from the downstream-side catalyst; and
- inhibiting diagnosis of the deterioration state of the upstream-side catalyst if the detected air-fuel ratio from the downstream-side catalyst becomes abnormal.

22. A method for detecting deteriorating of an upstream-side first exhaust emission control catalyst in the presence of a downstream-side second exhaust emission control catalyst, said method comprising:

- detecting an air-fuel ratio of exhaust gas flowing from the downstream-side catalyst; and
- initiating diagnosis of the deterioration state of the upstream-side catalyst only after the detected air-fuel ratio from the downstream-side catalyst remains within a predetermined range continuously during a predetermined period of time.

* * * * *